United States Patent [19]

Johnson et al.

[11] Patent Number: 4,853,037
[45] Date of Patent: Aug. 1, 1989

[54] LOW GLYCOL INKS FOR PLAIN PAPER PRINTING

[75] Inventors: Loren E. Johnson, Corvallis, Oreg.; Kenneth A. Norton, Richland, Wash.; Norman E. Pawlowski; Margaret L. Wooding, both of Corvallis, Oreg.

[73] Assignee: Hewlett-Packard Company, Palo Alto, Calif.

[21] Appl. No.: 115,496

[22] Filed: Oct. 30, 1987

[51] Int. Cl.$^4$ .............................................. C09D 11/02
[52] U.S. Cl. ........................................ 106/22; 106/20
[58] Field of Search ................................... 106/20, 22

[56] References Cited

U.S. PATENT DOCUMENTS

| | | | |
|---|---|---|---|
| 4,239,543 | 12/1980 | Beasley | 106/22 |
| 4,285,727 | 8/1981 | Uehara et al. | 106/22 |
| 4,299,630 | 11/1981 | Hwang | 106/22 |
| 4,724,001 | 2/1988 | Ohta et al. | 106/22 |

Primary Examiner—Amelia Burgess Yarbrough
Attorney, Agent, or Firm—William J. Bethurum

[57] ABSTRACT

An ink composition for printing on plain paper and other media using a thermal ink-jet printer is provided. The ink composition comprises at least one member selected from the group consisting of ethylene glycol and diethylene glycol, present in an amount ranging from about 5 to 10 wt %; dye, ranging from about 1 to 4 wt %; and the balance water. A biocide ranging from about 0.01 to 0.3 wt % and/or a buffering agent ranging in concentration from about 0.05 to 0.5 wt % may also be included.

The ink compositions of the invention permit printing on a large variety of plain papers, including bonds, photocopy paper and laser jet paper. These compositions are an improvement over other ink compositions and permit both high quality and letter quality printing to be achieved.

13 Claims, No Drawings

LOW GLYCOL INKS FOR PLAIN PAPER PRINTING

TECHNICAL FIELD

The present invention relates to ink compositions used in ink-jet printing, and, more particularly, to glycol-containing ink compositions.

BACKGROUND ART

Heretofore, the use of thermal ink-jet printing has typically required utilizing specially treated paper or other print media to ensure high quality printing. A problem with employing "plain" paper, i.e., uncoated paper such as xerography or photocopy paper, bond paper and laser jet paper, has been that the ink compositions typically used in ink-jet printing, especially thermal ink-jet printing, have not provided the high quality print desired. For example, the long drying times of water-based inks typically have resulted in smearing of the ink.

Because of the problems associated with these inks, coated media have been employed. However, it remains a goal of thermal ink-jet printing to be able to print on plain, untreated media.

Attempts have been made to improve the ink compositions. However, reducing the drying time of the ink can adversely affect other properties of the ink. For example, shortened drying times can lead to crusting of the nozzles in the printhead, with consequent partial or full blockage of the nozzles. Thus, efforts continue to develop suitable ink compositions for printing on plain paper and other media.

DISCLOSURE OF INVENTION

In accordance with the invention, an ink composition for printing on plain paper and other media using a thermal ink-jet printer is provided. The ink composition comprises at least one member selected from the group consisting of ethylene glycol and diethylene glycol, present in an amount ranging from about 5 to 10 wt %; dye, ranging from about 1 to 4 wt %; and the balance water. A biocide ranging from about 0.01 to 0.3 wt % may also be included. A buffering agent to control pH between about 3 and 11 may additionally be included.

The ink compositions of the invention permit printing on a large variety pf plain papers, including bonds, photocopy paper and laser jet paper. These compositions are an improvement over other ink compositions in that they exhibit little crusting, have reasonable dry times, and possess a very high print quality equal to that of a laser printer.

BEST MODES FOR CARRYING OUT THE INVENTION

It has been found that over a narrow range of glycol compositions and only for two glycol compounds that high resolution, letter quality printing can be achieved on plain papers. Ethylene glycol and diethylene glycol are the only two glycols that are effective in the disclosed range in providing such a result.

The two glycols, which may be employed alone or in any combination, are present in the ink composition ranging from about 5 to 10 wt %. Less than about 5 wt % results in undue crusting of the nozzles of the printhead, while greater than about 10 wt % yields poor print quality.

The dye comprises any of the dyes commonly employed in the ink-jet printing art, such as Food Black 2, Direct Red 227, Direct Blue 199, Direct Yellow 86. These dyes are commonly known as anionic dyes and contain one or more sulfonate ($SO_3^-$) may also be used. As is well-known, these dyes are commonly associated with sodium cations.

While the above-mentioned anionic dyes may be suitably employed in the practice of the invention, partial or substantially total substitution of the associated sodium cations with other cations, such as alkali metal ions, e.g., lithium ($Li^+$), or tetraalkyl ammonium cations, e.g., tetramethylammonium (($CH_3)_4N^+$) cations, reduces crusting and results in increased solubility in the ink vehicle (glycol plus water). Such substitution of cations is the subject of other pending applications, specifically, Ser. No. 011,186, and Ser. No. 011,190, both filed Feb. 5, 1987, and hence does not form a part of this invention. Examples of other substitutions include protonated ammonium compounds, such as protonated alkanol ammonium cations, e.g., triethanol ammonium cation ($HN^+(C_2H_5OH)_3$), and cationic amides such as the protonated form of formamide (HO—C-(O)—$NH_3^+$), as disclosed and claimed in Ser. No. 866,728, filed May 27, 1986.

The dye is present in an amount ranging from about 1 to 4 wt %, and preferably about 2 to 4 wt %. The maximum dye concentration is governed by its solubility in the vehicle. Accordingly, use of the cation-substituted dyes provides a margin of safety in avoiding crusting or precipitation of the ink on the nozzles.

A biocide is preferably employed to assure long shelf life. Any of the biocides commonly employed in inks are suitably utilized. Examples of such biocides include Proxel CRL, available from ICI (Wilmington, DE), and Nuosept 95, available from Nuodex Co. (Piscataway, NJ). The biocide typically ranges from about 0.01 to 0.3 wt % of the total ink composition.

A pH buffering agent is optionally employed. The purpose of the buffering agent is to maintain the pH of the ink composition in a region which is compatible with the material set being used in order to prevent corrosion, dissolution, and/or loss of adhesion in the materials used in the printhead (e.g., adhesives, orifice plate, pen body material, etc.). The pH must also be maintained at a specific level when certain dyes are used, in order to ensure solubility of the dye.

Any buffering agent which is effective in millimolar amounts, does not react with the dye, and yields the desired pH range may be utilized in the practice of the invention. Examples of suitable basic buffering agents include sodium borate, sodium hydrogen phosphate, and sodium dihydrogen phosphate. Well-known acidic buffering agents may also be employed in the practice of the invention.

The buffering agent concentration should not exceed about 0.5 wt % of the total ink composition due to crusting considerations. The buffering agent is typically used in the range of about 0.05 to 0.1 wt % of the total ink concentration, in order to reduce the possibility of crusting.

The balance of the ink compositions of the invention comprises water, specifically, deionized water.

Ink compositions within the foregoing listed ranges will print on a large variety of plain papers, such as xerography or photocopy paper, bond paper, and laser jet paper. The print quality achieved is high, and provides letter quality printing using a thermal ink-jet pen.

Without subscribing to any particular theory as to why this narrow range of compositions permits printing on such a wide variety of plain papers with high quality, it appears that the compositions have increased surface tension and a particular hydrophilic/lipophilic balance. These factors appear to combine to increase the contact angle between the ink composition and the fiber making up the print medium. These factors reduce the tendency and extent of capillary rise (and hence reduce wicking, feathering and uncontrollable dot size). There is, however, sufficient glycol in the composition imparting a lipophilic nature to the system to allow fairly rapid penetration of the surface and hence a more rapid dry time than a totally aqueous system would.

The use of the ink compositions of the invention is only applicable in systems where dot density (DPI—dots per inch) is high and resolution is high enough to allow drop overlap. It should be noted that in prior art ink compositions, glycols are added to the ink as humectants and as capillary modifiers in order to increase the dot size in low resolution systems, whereas in this teaching the glycol acts as a non-volatile solvent for the dye and as an initial surface penetrant.

INDUSTRIAL APPLICABILITY

The ink compositions of the invention are suitably employed in thermal ink-jet printers for printing on a wide variety of plain papers, to provide high print quality and letter quality printing.

EXAMPLES

1. Black Ink

A composition comprising 5.5 wt % diethylene glycol (DEG), 2.3 wt % lithium-substituted Food Black 2 dye (at least about 75% substitution of Na+), 0.01 wt % ICI Proxel CRL biocide, 0.08 wt % sodium borate, and the balance deionized water was prepared. This ink produced laser printer quality print having a dry time of less than 20 seconds and the ability to remain in an uncapped pen for a minimum of 20 days without crusting. No bacterial growth was observed in the ink.

2. Magenta Ink

A composition comprising 5.5 wt % DEG, 2 wt % Direct Red 227 dye, 0.3 wt % Nuodex Co. Nuosept 95 biocide, 0.08 wt % sodium borate, and the balance deionized water was prepared. This ink gave the same results as observed in Example 1.

3. Cyan Ink

A composition comprising 5.5 wt % DEG, 2 wt % Direct Blue 199 dye, 0.3 wt % Nuodex Co. Nuosept 95 biocide, 0.08 wt % sodium borate, and the balance deionized water was prepared. This ink gave the same results as observed in Example 1.

4. Yellow Ink

A composition comprising 5.5 wt % DEG, 1 wt % Direct Yellow 86 dye, 0.3 wt % Nuodex Co. Nuosept 95 biocide, 0.08 wt % sodium borate, and the balance deionized water was prepared. This ink gave the same results as observed in Example 1.

5. Black Ink

A composition comprising 10 wt % DEG, 2.3 wt % lithium-substituted Food Black 2 dye, 0.08 wt % sodium borate, and the balance deionized water was prepared. This ink produced laser quality print on bond papers and good (letter quality) print on most photocopy paper. Bacterial growth was observed in the ink after storage.

6. Black Ink

For comparison, a composition comprising 12 wt % DEG, 2.3 wt % lithium-substituted Food Black 2 dye, 0.08 wt % sodium borate, and the balance deionized water was prepared. This ink produced laser quality print on bond papers and unacceptable (less than letter quality) print on photocopy paper.

7. Black Ink

For comparison, a composition comprising 15 wt % DEG, 2.3 wt % lithium-substituted Food Black 2 dye, 0.08 wt % sodium borate, and the balance deionized water was prepared. This ink produced good (letter quality) print on bond papers and unacceptable (less than letter quality) print on photocopy paper. The dry time was slower than that of inks containing lower amounts of DEG.

8. Black Ink

For comparison, a composition comprising 50 wt % DEG, 2.3 wt % lithium-substituted Food Black 2 dye, 0.08 wt % sodium borate, and the balance deionized water was prepared. This ink produced unacceptable (less than letter quality) print on most media, except custom-coated paper.

What is claimed is:

1. An ink composition for use in ink-jet printers for printing on plain paper comprising:
   (a) about 5 to 10 wt % diethylene glycol;
   (b) about 1 to 4% of a soluble dye; and
   (c) the balance water.

2. The ink composition of claim 1 further including about 0.05 to 0.5 wt % of a buffering agent.

3. The ink composition of claim 2 wherein said buffering agent consists essentially of a compound selected from the group consisting of sodium borate, sodium hydrogen phosphate, and sodium dihydrogen phosphate.

4. The ink composition of claim 1 wherein said soluble dye comprises an anionic dye having cations associated therewith.

5. The ink composition of claim 4 wherein said anionic dye includes at least one of the anionic groups selected from sulfonate and carboxylate groups.

6. The ink composition of claim 4 wherein said cations are selected from the group consisting of alkali metal ions, tetraalkyl ammonium cations, protonated ammonium cations, and protonated amides.

7. An ink composition for use in thermal ink-jet printers for printing on plain paper consisting essentially of
   (a) about 5 to 10 wt % diethylene glycol;
   (b) about 1 to 4 wt % of a soluble dye comprising an anionic dye having cations associated therewith, said anionic dye including at lest one of the anionic groups selected from sulfonate and carboxylate groups; and
   (c) the balance water.

8. The ink composition of claim 7 further including about 0.05 to 0.5 wt % of a buffering agent.

9. The ink composition of claim 8 wherein said buffering agent consists essentially of a compound selected from the group consisting of sodium borate, sodium hydrogen phosphate, and sodium dihydrogen phosphate.

10. The ink composition of claim 7 wherein said cations are selected from the group consisting of alkali metal ions, tetraalkyl ammonium cations, protonated ammonium cations, and protonated amides.

11. An ink composition for use in thermal ink-jet printers for printing on plain paper consisting essentially of (a) about 5 to 10 wt % diethylene glycol;
(b) about 1 to 4 wt % of a soluble dye comprising an anionic dye having cations associated therewith, said anionic dye including at least one of the anionic groups selected from sulfonate and carboxylate groups;
(c) about 0.05 to about 0.5 wt % of a buffering agent; and
(d) the balance water.

12. The ink composition of claim 11 wherein said buffering agent consists essentially of a compound selected from the group consisting of sodium borate, sodium hydrogen phosphate, and sodium dihydrogen phosphate.

13. The ink composition of claim 11 wherein said cations are selected from the group consisting of alkali metal ions, tetraalkyl ammonium cations, protonated ammonium cations, and protonated amides.